June 12, 1956 J. F. NICHOLSON ET AL 2,750,587

KINESCOPE MASK AND DUST SEAL

Filed Nov. 2, 1953

INVENTORS
James F. Nicholson AND
Donald J. Ransom
BY [signature]
ATTORNEY

United States Patent Office 2,750,587

Patented June 12, 1956

2,750,587

KINESCOPE MASK AND DUST SEAL

James F. Nicholson, Millersville, and Donald J. Ransom, Lancaster, Pa., assignors to Radio Corporation of America, a corporation of Delaware Application November 2, 1953, Serial No. 389,567

9 Claims. (Cl. 340—367)

The present invention relates to a new and improved kinescope mask structure which also serves as a dust seal for the kinescope face and which affords protection in the event of kinescope implosion.

As is well known in the field to which the present invention appertains, some means for "masking" the outer edges of a television receiver kinescope is necessitated by the fact that the extreme peripheral portions of the kinescope face are not used in the reproduction of a television image. Thus, there have been proposed various mask structures for providing a neat and esthetically pleasing masking of the peripheral or fringe areas of the kinescope face in a television receiver cabinet. As is also well known, it is considered quite desirable to provide means for preventing dust from reaching and settling upon the face of a kinescope in a receiver, since dust obscures to a certain extent, at least, the visibility and definition of the image produced by the kinescope. Another structure which has been considered as being of real importance in the construction of television receiver cabinets is the conventional safety glass which is designed and intended to protect viewers against flying fragments of glass which result from the implosion of a kinescope.

It is a primary object of the present invention to provide a novel and effective structure which combines the functions of kinescope mask and dust seal and which serves to prevent shattering of the safety glass in a television receiver cabinet in the event of an implosion of the kinescope.

A further object of the present invention is the provision of means as set forth, which means require no modification of existing television cabinet design but which increase the effectiveness of the cabinet safety glass multifold.

In general, the present invention contemplates the provision of a combination kinescope mask and dust seal in the nature of a frangible seal which, upon implosion of the kinescope, ruptures to permit air to rush into the otherwise nearly air tight space between the receiver safety glass and the kinescope shell, thereby preventing the safety glass from being dislocated and broken. As will appear more fully hereinafter, the frangible mask and dust seal of the invention permits the use of inexpensive safety glass of the "tempered glass" type which, when used with prior art masks of the rigid and non-frangible type, is ordinarily shattered by the initial forces resulting from kinescope implosion.

Thus, it is a further object to provide a kinescope mask and dust seal in the form of a frangible structure which is easily ruptured by unequal air pressures resulting from the implosion of the kinescope.

Additional objects and advantages of the present invention will become apparent to persons skilled in the art from a study of the following detailed description of the accompanying drawing in which.

Figure 1:
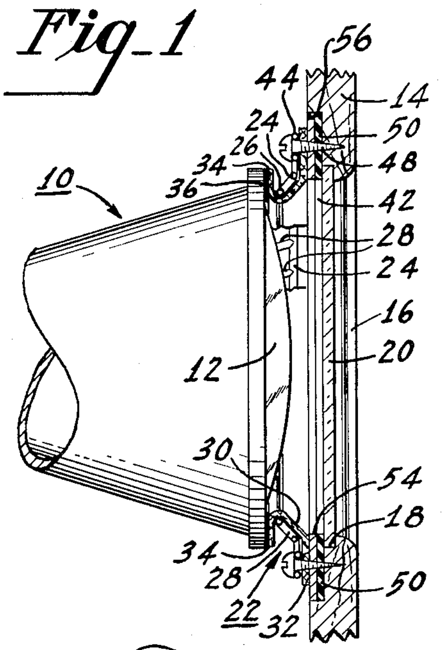
Fig. 1 is a vertical sectional view of a portion of a television receiver, illustrating the frangible mask and dust seal of the present invention.

Referring to the drawing, and, more particularly to Fig. 1 thereof, there is shown a television image-reproducing tube or kinescope 10 which is illustrated as being of the metal cone type having, of course, a screen or face plate 12 of glass. The kinescope 10 is supported, by means not shown, within a cabinet having a front wall 14 which is provided with an opening 16 which may, for example, be of generally rectangular shape to match the shape of the kinescope face 12. While the arrangement in Fig. 1 is described as including a rectangular kinescope and opening, it will be understood that, where a round kinescope is used, the opening 16 in the front wall 14 of the receiver cabinet may also be round, rather than rectangular. Seated within a recess 18 in the receiver cabinet front wall is a pane 20 of safety glass which may be of the "tempered glass" variety now well known in the art. The mask and dust seal structure of the present invention is indicated generally by reference numeral 22 and comprises a relatively rigid wire framework made up of front and rear rings or loops 24 and 26, respectively, joined together at a plurality of points by means of struts 28. Surrounding the framework 22 is a sheet 30 of paper or other material which is of such nature as to be easily ruptured by air pressure. It will be understood, of course, that the various elements such as the wire frame and the paper covering 30 are exaggerated in thickness, merely for purposes of illustration.

The paper sheet 30 which performs the dust sealing function is shown, more specifically, as including front and rear flanges 32 and 34, respectively. The rear flange 34 is or may be secured to the face plate 12 of kinescope 10 about its peripheral region as by means of a layer of cement or glue 36. The layer of cement is mentioned herein in the interest of completeness of description, since it constitutes an additional means for effecting the dust seal. Assuming, however, that the rear loop 26 of the wire frame presses the paper flange 34 sufficiently tightly against the kinescope face plate 12, the cement may be dispensed with, if desired.

Figure 2:
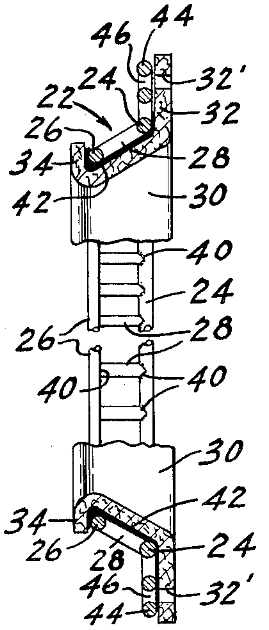
Fig. 2 is a similar view, with portions broken away, of the mask and dust seal per se.

Fig. 2 illustrates the wire frame and paper sheet removed from their environment in the receiver cabinet and shows more clearly the fact that each of the wire loops 24 and 26 is continuous about the periphery of the paper sheet 30, the two loops being joined by struts 28 which are, by way of illustration, shown as welded to the loops as at points 40. In order to secure the paper sheet 30 to the wire frame, the two members may be joined as by a layer of suitable cement shown at 42.

The method and structure for suitably connecting the mask to the receiver cabinet front wall 14 may best be seen from Figs. 1 and 2 which illustrate the fact that wire ring 24 is provided at several points about its periphery with rings or eyelets 44, each of which has an opening 46 designed to receive the shank of a screw 48. Disposed between the cabinet front wall 14 and the dust seal and mask 22 are a resilient frame 50 having a rectangular opening 52 and a fiber board frame 54 having a rectangular opening 56, both of the openings mentioned being of the same general shape as that in the front wall of the cabinet. The rubber mounting frame 50 and the fiber board frame 54 are shown as being seated in a recess 56 in the cabinet front wall 14, which recess is located behind the safety glass seat 18. Screws 48 passing through the eyelets 44 of the wire frame and through openings 32′ in the front flange of the paper seal also pass through and secure the fiber board frame 54 and the resilient rubber mounting 50 to the cabinet front wall 14. While other securing means may be employed, the fiber board frame 54 together with the rubber member 50 may serve to clamp the safety glass pane 20 securely in place.

Figure 3:
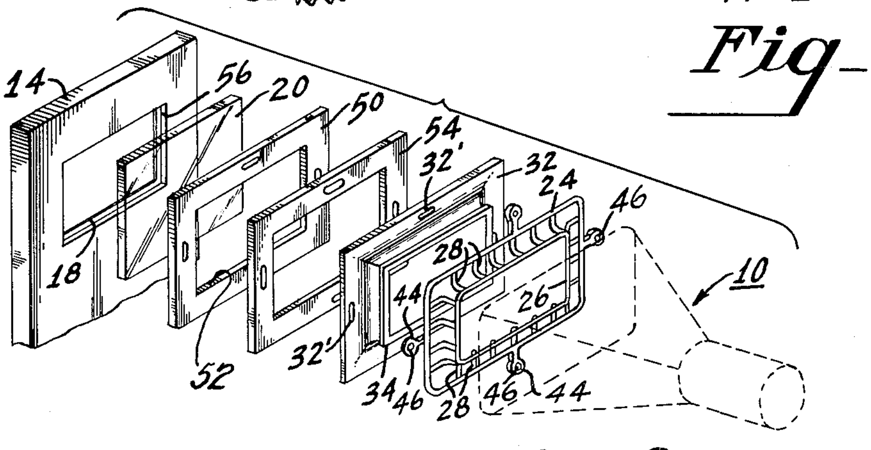
Fig. 3 is an exploded view of the various elements of structure shown in Fig. 1.

Fig. 3 shows the parts recited above in an exploded view and, more particularly, indicates the relative position of the following elements between the cabinet front wall 14 and the kinescope 10: Safety glass pane 20, rubber mounting 50, fiber board frame 54, paper sheet 30 with its front and rear flanges 32 and 34, and the wire frame comprising front and rear loops 24 and 26, respectively, joined by the struts 28.

In the operation of the combination mask and dust seal of the present invention, assuming that, for some reason, there occurs an implosion of the kinescope 10 such that its face plate 12 is fractured, there will be produced a vacuum in the space between the kinescope face plate and the safety glass 20 such as would ordinarily (i. e., with prior art masks) cause the face plate to be subjected to such inequality of pressures as to result in its being broken out of its normal position. The present invention, however, as stated supra, provides the frangible dust seal 30 which, when subjected to the external air pressure on one surface, acting against the vacuum in the space which it encloses, will rupture or tear, thereby permitting air to rush into the space between the kinescope and the safety glass. The incoming air thus effectively neutralizes the pressures acting on the safety glass from both sides thereof, thereby enabling the pane of safety glass to withstand the initial forces following the implosion of the kinescope. In view of the foregoing, any fragments of glass from the broken face plate 12 which may rebound from the interior of the metal envelope of the kinescope will meet the safety glass and be prevented from passing out of the cabinet. By reason of the fact that, with the mask of this invention, the safety glass is not subjected to the strong forces described upon the implosion of the kinescope, it is practicable to use the relatively inexpensive "tempered glass" so that it is unnecessary to resort to the far more expensive laminated glass.

By way of summary, therefore, it will be seen that the present invention provides a kinescope mask and dust seal which, by reason of its frangible nature, protects the safety glass from the forces resulting from the kinescope implosion, so that the safety glass may remain intact and in position to serve as a barrier against flying fragments of kinescope face plate.

Figure 4:
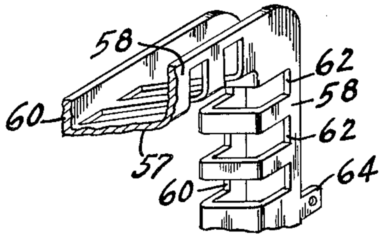
Fig. 4 illustrates, by way of fragmentary view, another form of the invention.

Another form of the mask framework which may be employed in accordance with the invention is illustrated in Fig. 4, by way of a fragmentary, isometric view. Here, instead of the framework being made of wires as in the preceding figures, it is or may be formed of a sheet 57 of metal, plastic or other suitable and relatively rigid material, the sheet being provided with front and rear flanges 58 and 60, respectively. In order to serve as a framework for a frangible dust seal such as the paper sheet described in connection with Figs. 1, 2 and 3, the frame of Fig. 4 is provided with cut outs or apertures 62 and have mounting tabs 64 which perform the same function as the eyelets 44 of the wire framework of the preceding figures. In use, the frame of Fig. 4 forms, together with a sheet of thin paper or the like (not shown) which is or may be cemented to its inner surface, a unitary structure functionally similar to that illustrated in Fig. 2 and may be used in substantially the same manner in a television receiver as the latter structure. An advantage of the form of the invention shown in Fig. 4 is that it may be fabricated from existing masks which are, in many cases, made of thin plastic material by cutting apertures such as those shown at 52 into the conventional mask and then pasting or otherwise securing a thin, frangible sheet of covering material over the mask to hide the openings from view. The operation of the device thus formed from the frame of Fig. 4 will, in all respects, be the same as that described with respect to the structures of the preceding figures.

Having thus described our invention, what we claim as new and desire to secure by Letters Patent is:

1. A mask structure for use in conjunction with a cathode ray tube having a face plate, comprising a substantially continuous sheet member forming a generally cylindrical structure having inner and outer surfaces and capable of obscuring the peripheral portion of such face plate, said member being readily frangible when subjected to unequal air pressures on its inner and outer surfaces.

2. A mask structure for use in conjunction with an evacuated cathode ray image tube having a viewing screen and mounted within an enclosure having a viewing opening covered by a transparent member, which comprises: an imperforate sheet member having inner and outer surfaces, one end of said sheet being of such size as to be capable of defining a dust seal with and obscuring the peripheral portion of such screen, the other end of said sheet being adapted to define a dust seal with said enclosure including such transparent cover member, said sheet member comprising material capable of being ruptured when subjected to substantially unequal air pressures acting upon its opposite surfaces.

3. The invention as defined by claim 2 wherein each end of said sheet member defining a loop is turned radially whereby to form a radial flange.

4. The invention as defined by claim 2 comprising a foraminous frame for said looped sheet, said frame being of generally the same shape as said sheet and of such dimension as to form a close fit therewith.

5. The invention as defined by claim 4 wherein said frame includes means for connection to such enclosure.

6. The invention as defined by claim 4 wherein said foraminous frame comprises a first ring-like member and a second ring-like member and spaced struts joining said first and second ring-like members.

7. A mask structure for use in conjunction with an evacuated cathode ray tube having a viewing screen and mounted within an enclosure having a viewing opening covered by a transparent member, which comprises: an imperforate sheet member having inner and outer surfaces and defining a flared loop whose smaller end is capable of defining a dust-free seal with an obscuring the peripheral portion of such viewing screen and whose larger end is adapted to define a dust seal with said enclosure surrounding such transparent cover member, said sheet member comprising material capable of being ruptured when subjected to substantially unequal air pressures acting upon its opposite surfaces.

8. A mask structure as defined by claim 1 which further comprises a skeleton frame for said sheet member, said frame being of such dimension as to fit around said structure snugly.

9. In combination with a cathode ray tube having a viewing screen and a window spaced from said screen, a sheet-like member enclosing the space between said screen and window, said sheet-like member being capable of affording communication between said region and the surrounding atmosphere in response to a substantial inequality of air pressures on its opposite surfaces.

References Cited in the file of this patent

UNITED STATES PATENTS

| | | |
|---|---|---|
| 1,549,665 | Hill et al. | Aug. 11, 1925 |
| 2,224,287 | Busch | Dec. 10, 1940 |
| 2,606,241 | Steinke | Aug. 5, 1952 |